3,173,780
Patented Mar. 16, 1965

3,173,780
METHOD OF PRODUCING AN ULTRASONIC SOLID DELAY LINE
Herbert L. Hoover, Corning, N.Y., assignor to Corning Glass Works, Corning, N.Y., a corporation of New York
No Drawing. Filed June 19, 1961, Ser. No. 117,851
5 Claims. (Cl. 65—62)

This invention relates to the production of ultrasonic solid delay lines, and more particularly a glass delay medium for use in such lines.

Reference is made to a companion application S.N. 118,185, entitled "Temperature Stable Ultrasonic Delay Lines," filed by M. E. Nordberg and myself, and assigned to a common assignee. That application discloses that alkali-lead-silicate glasses, including corresponding glasses in which partial substitution is made for lead oxide, within defined composition ranges have acoustical properties particularly desirable for production of delay line media. A delay line medium is the means or component in a delay line in which acoustical wave propagation takes place and the desired time delay is effected. The application further teaches that alkali-lead-silicate glasses wherein the alkali metal oxide content consists solely or largely of potassium oxide ($K_2O$) are particularly desirable because of their low temporal instability.

Temporal instability, as here used, refers to changes which occur in the characteristic delay time of a glass delay medium with time, that is, as the glass ages. The amount of change that occurs may be quite small, but still sufficiently large to render a glass delay medium unsatisfactory for certain types of delay lines. Thus, for certain purposes, the maximum life time change permitted in delay time is about 0.003% or about 0.001 microsecond in a thirty microsecond delay line.

The effect of composition is described in the companion application. I have further discovered that the degree of temporal instability in such alkali-lead-silicate glasses, as well as other acoustical properties such as attenuation, may vary considerably depending on the thermal history of the glass. By this I mean the manner in which the glass is cooled from an elevated temperature either during initial production or in the course of subsequent processing or use. More particularly, I have found that optimum acoustical properties are imparted to a glass by cooling or annealing the glass from an elevated temperature at a very slow rate.

It is then a primary purpose of this invention to provide an annealing or cooling method for alkali-lead-silicate glass delay line media that imparts optimum acoustical properties to the glass. A further purpose is to provide an improved glass delay line medium. A specific purpose is to provide a glass delay line medium having a minimum degree of temporal instability and a method of producing such delay line component. Another specific purpose is to further improve the acoustical characteristics of the glasses disclosed in the Hoover-Nordberg application.

To these and other ends, my invention resides in a method of producing an alkali-lead-silicate glass delay line medium which comprises subjecting the glass to an annealing process wherein it is cooled from a temperature at or above its annealing temperature to a temperature not over 200° C., and preferably about 150° C., at a rate not exceeding about 5 C.° per hour.

In this application, annealing or cooling rates are prescribed with reference to glass articles wherein the thickness or diameter is on the order of ½–¾ inch, unless otherwise specified. Dimensionally, delay line media are customarily within this range. It will be appreciated, however, that thicker or more massive glass elements will require a correspondingly slower cooling rate for optimum benefits.

The art of annealing glass articles to remove or relieve strain in the glass is well known. Customarily, the glass annealing process involves heating the glass to its annealing point (the temperature at which a glass has a viscosity of $10^{13}$ poises), or slightly higher, and holding at that temperature for sufficient time to render the glass essentially strain free. The glass is then cooled, at a controlled rate, to a temperature at or slightly below the strain point (the temperature at which a glass has a viscosity of $10^{14.5}$ poises). At this temperature the glass is substantially rigid and is usually cooled at a much more rapid rate to room temperature. The annealing process, as such, and conventional annealing schedules for various types of glass are described in detail in Glass Engineering Handbook, second edition, 1958, by E. B. Shand and published by McGraw-Hill Book Company.

It has long been recognized that the rate at which a glass article may be successfully annealed will vary inversely with the size of the article. Thus, large or massive glass articles must be cooled extremely slowly to avoid introduction of stress and possible fracture.

It is also well known, particularly in the optical glass art, to employ a "fine" anneal to improve optical properties such as refractive index. This process of fine annealing involves cooling the optical glass blanks or articles at a relatively slow rate through the annealing range, that is from the annealing temperature to the strain temperature or slightly below. For example, a typical optical fine annealing may involve cooling the glass at a rate of about 5 C.° per hour from the glass annealing point to about 20 C.° below the glass strain point. Thereafter the glass is cooled at a rate of 50–100 C.° per hour down to room temperature.

For the acoustical purposes of my invention, an alkali-lead-silicate glass delay line medium is heated to the annealing point of the glass and held at that temperature to remove strain in the usual manner. After a suitable hold time, the glass is then cooled, or finely annealed, at a rate not exceeding about 5 C.° per hour. For optimum acoustical benefits, an annealing rate of 2 to 3 C.° per hour is preferred.

In contrast to prior optical annealing practice, however, I have found that, for acoustical purposes, this very fine annealing rate must be continued well below the normal limit of the annealing range, which is about 20° C. below the glass strain point. Some degree of benefit may result from a slow cooling rate between 150° C. and room temperature. However, 150° C. is a practical minimum temperature for slow cooling since subsequent processing steps and service treatments will normally obviate any advantage obtained in this lower range. Actually, the resultant loss in temporal stability from rapid cooling below 200° C. is relatively small, and it may be expedient to terminate the slow cooling at this temperature for some purposes.

The Hoover-Nordberg application, mentioned earlier, describes glass compositions characterized by acoustical properties particularly adapted to production of delay line propagation media. However, when these glasses are annealed in accordance with the present method, it is found that their acoustical properties, particularly the temporal stability and attenuation characteristics, are still further improved. Accordingly, the present method is of primary utility when employed in connection with such glasses to further improve their characteristics.

The glasses of the Hoover-Nordberg application are composed of heavy metal oxides in an amount equivalent to 20 to 50% PbO, alkali metal oxides in an amount equivalent to 4 to 20% $K_2O$, and the balance essentially $SiO_2$. At least one-half of the heavy metal oxide content should be PbO, while the remainder may be selected from oxides of lead, cadmium, barium and bismuth, with the CdO and BaO contents not exceeding 10% and the content of $Bi_2O_3$ no exceeding 25%. At least one-half of the alkali metal oxide content should be $K_2O$, and, for optimum temporal stability, the alkali metal oxide content should consist largely or completely of this oxide. The relationship of heavy metal oxide content (expressed as equivalent to PbO) to alkali metal oxides, within the limits set forth above, may be expressed as $$PbO = (62 \pm 2) - {}^{15}\!/_{7}(K_2O + 2.5Na_2O + 3Li_2O)$$

It will be understood that all references to glass compositions and components are in terms of percent by weight as calculated from the glass batch formulation.

By way of specifically illustrating practice of the invention, a glass composed of about 7% $K_2O$, 47% PbO, and 46% $SiO_2$ was melted at about 1450° C. After being suitably homogenized, the glass was cooled and formed in customary manner into either cane or plate-type blanks depending on the type of delay medium to be produced. This glass has an annealing point of 470° C. and a strain point of 425° C.

Subsequent to forming, the shaped glass blanks, e.g. ⅝" x 6" x 6" plates, were heated to a temperature of about 475° C., held at that temperature for an hour and then cooled at the rate of 3° C. per hour to a temperature of 150° C. As is customary in kiln or furnace annealing, the furnace was then opened and cooled to ambient at a rate as high as 100 ° C. per hour. The annealed glass blanks were then processed by grinding and polishing in conventional manner preparatory to delay line assembly.

It has been found that, through use of the extended and unusually slow fine annealing of this invention, the temporal stability and attenuation in such a delay line glass may be improved by as much as 50% over the corresponding values for these properties obtained with ordinary optical annealing practice. The improvement over more standard commercial annealing practice is of much larger degree.

What is claimed is:

1. A method of effecting a predetermined time delay in a propagated acoustical wave with a minimum amount of signal attenuation and change in the characteristic delay time which comprises
    forming an alkali-lead-silicate glass delay line medium,
    subjecting this glass delay line medium to a cooling process wherein it is cooled from the glass annealing point to a temperature not exceeding 200° C. at a rate not over 5° C. per hour, whereby the acoustical characteristics of the glass are improved,
    mounting the improved glass delay line medium in an operative relationship in an acoustical delay line, and
    propagating an acoustical wave through said glass delay line medium.

2. The method in accordance with claim 1 wherein the glass is cooled at the prescribed rate to a temperature of about 150° C.

3. A method in accordance with claim 1 wherein the rate of cooling is not over 3° C. per hour.

4. A method in accordance with claim 1 wherein the alkali-lead-silicate glass consists of heavy metal oxides in an amount equivalent to 20 to 50% PbO, alkali metal oxides in an amount equivalent to 4 to 25% $K_2O$, the balance being essentially silica, and the alkali metal oxide content being such, with respect to the heavy metal oxides equivalent to PbO, as to be expressed by the formula:

$$PbO = (62 \pm 2) - {}^{15}\!/_{7}(K_2O + 2.5Na_2O + 3Li_2O)$$

5. An alkali-lead-silicate glass delay line medium produced in accordance with the method of claim 1.

References Cited in the file of this patent
UNITED STATES PATENTS 2,871,624     Upton _____ Feb. 3, 1959

FOREIGN PATENTS 479,631     Great Britain _____ Feb. 9, 1938

OTHER REFERENCES

Hodkin et al.: Glass Technology, publ. by Van Nostrand, 1925, p. 493.